(12) United States Patent
Nakane

(10) Patent No.: US 11,226,454 B2
(45) Date of Patent: Jan. 18, 2022

(54) CLEANING TOOL FOR OPTICAL CONNECTOR

(71) Applicant: Fujikura Ltd., Tokyo (JP)

(72) Inventor: Junichi Nakane, Chiba (JP)

(73) Assignee: FUJIKURA LTD., Tokyo (JP)

( * ) Notice: Subject to any disclaimer, the term of this patent is extended or adjusted under 35 U.S.C. 154(b) by 206 days.

(21) Appl. No.: 16/620,043

(22) PCT Filed: Feb. 16, 2018

(86) PCT No.: PCT/JP2018/005470
§ 371 (c)(1),
(2) Date: Dec. 6, 2019

(87) PCT Pub. No.: WO2018/230040
PCT Pub. Date: Dec. 20, 2018

(65) Prior Publication Data
US 2020/0103600 A1    Apr. 2, 2020

(30) Foreign Application Priority Data

Jun. 14, 2017  (JP) ............................. JP2017-117010

(51) Int. Cl.
*G02B 6/38* (2006.01)
(52) U.S. Cl.
CPC .................. *G02B 6/3866* (2013.01)
(58) Field of Classification Search
CPC .................................................. G02B 6/3866
See application file for complete search history.

(56) References Cited

U.S. PATENT DOCUMENTS

| 6,374,030 | B2 | 4/2002 | Krow, Jr. et al. |
| 6,592,268 | B2 | 7/2003 | Chen et al. |
| 6,681,437 | B1 | 1/2004 | Miyake et al. |
| 6,839,935 | B2 * | 1/2005 | Kiani ................. B08B 1/00 15/210.1 |
| 6,865,329 | B2 * | 3/2005 | Fujiwara ............ B08B 1/00 15/106 |
| 7,089,624 | B2 * | 8/2006 | Malevants ........ B08B 1/008 134/21 |
| 2002/0131748 | A1 * | 9/2002 | Sato ............... G02B 6/3866 385/134 |
| 2003/0026549 | A1 | 2/2003 | Ellis et al. |
| 2004/0086232 | A1 * | 5/2004 | Fujiwara ........... B08B 11/00 385/53 |
| 2016/0041345 | A1 | 2/2016 | Kamouchi et al. |

FOREIGN PATENT DOCUMENTS

| CN | 1798993 | A |   | 7/2006 |   |
| JP | 2002139652 | A |   | 5/2002 |   |
| JP | 2002219421 | A |   | 8/2002 |   |
| JP | 2002333551 | A |   | 11/2002 |   |
| JP | 2003050338 | A | * | 2/2003 | ............ G02B 6/36 |
| JP | 2016004063 | A |   | 1/2016 |   |

\* cited by examiner

*Primary Examiner* — Daniel Petkovsek
(74) *Attorney, Agent, or Firm* — Osha Bergman Watanabe & Burton LLP

(57) ABSTRACT

A cleaning tool for an optical connector includes: a body part; a substrate to which the body part is fixed; and a head unit that includes: a head that presses a cleaning unit against the optical connector; and a head housing that houses the head. The head housing fits on a housing of the optical connector, and the head unit moves with respect to the substrate.

6 Claims, 11 Drawing Sheets

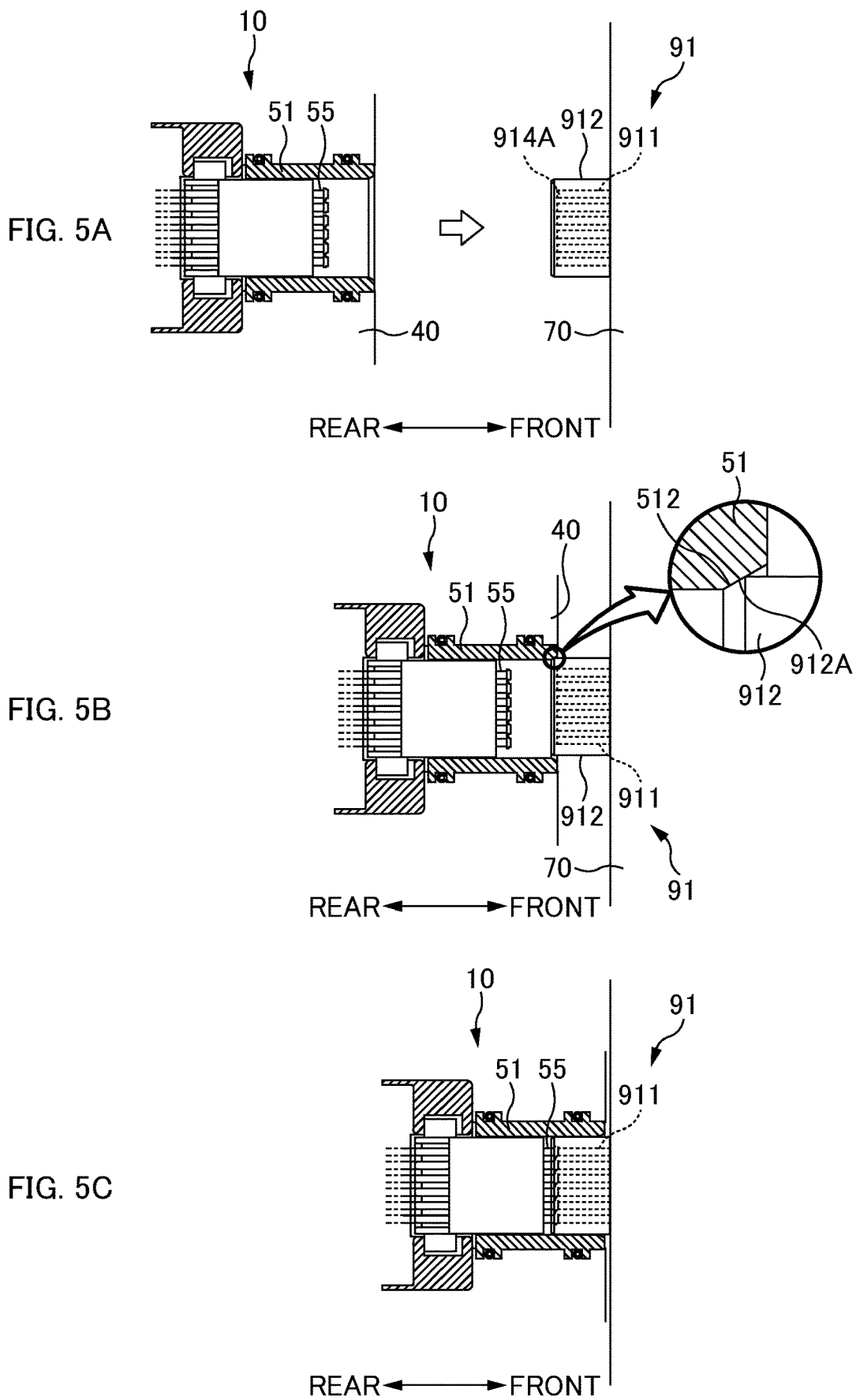

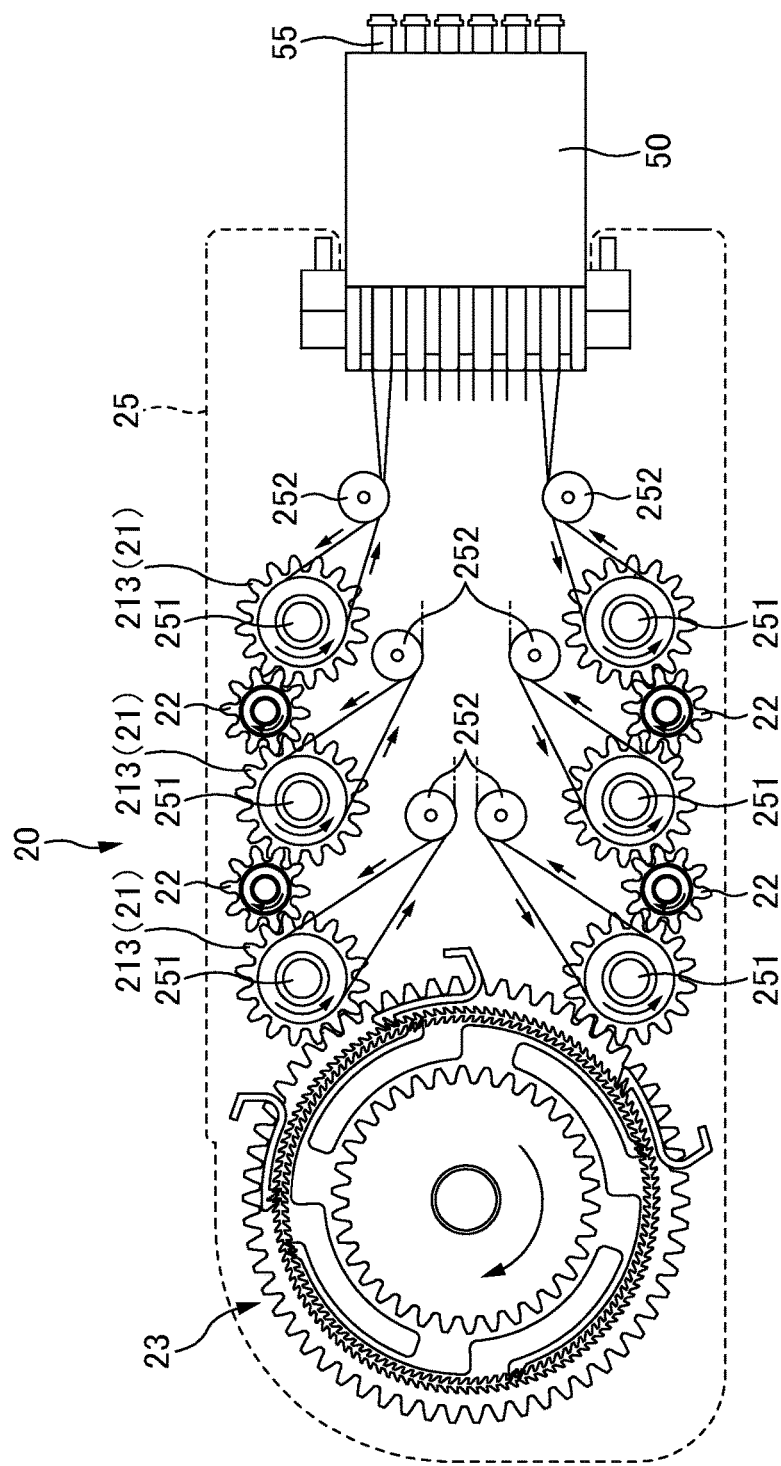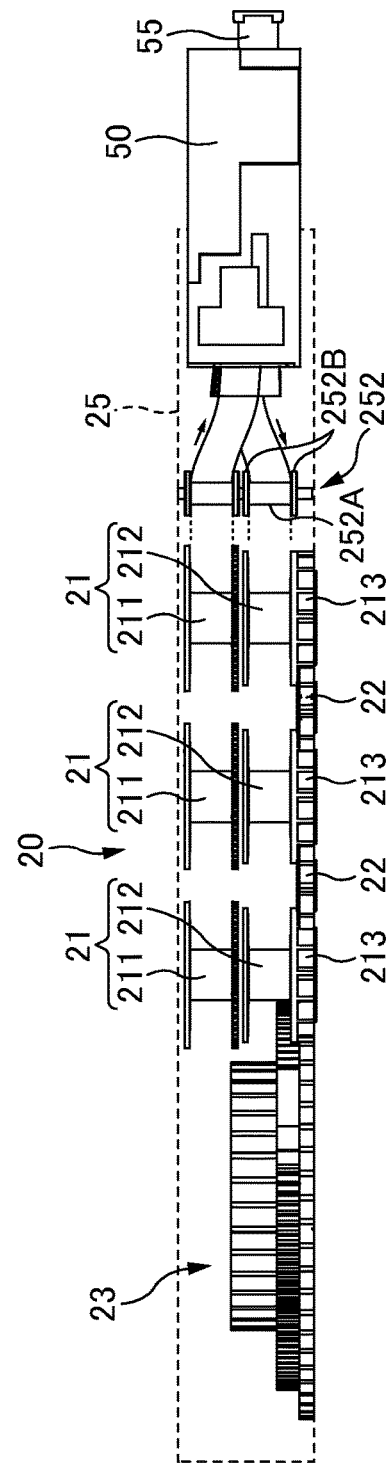
FIG. 8A
FIG. 8B

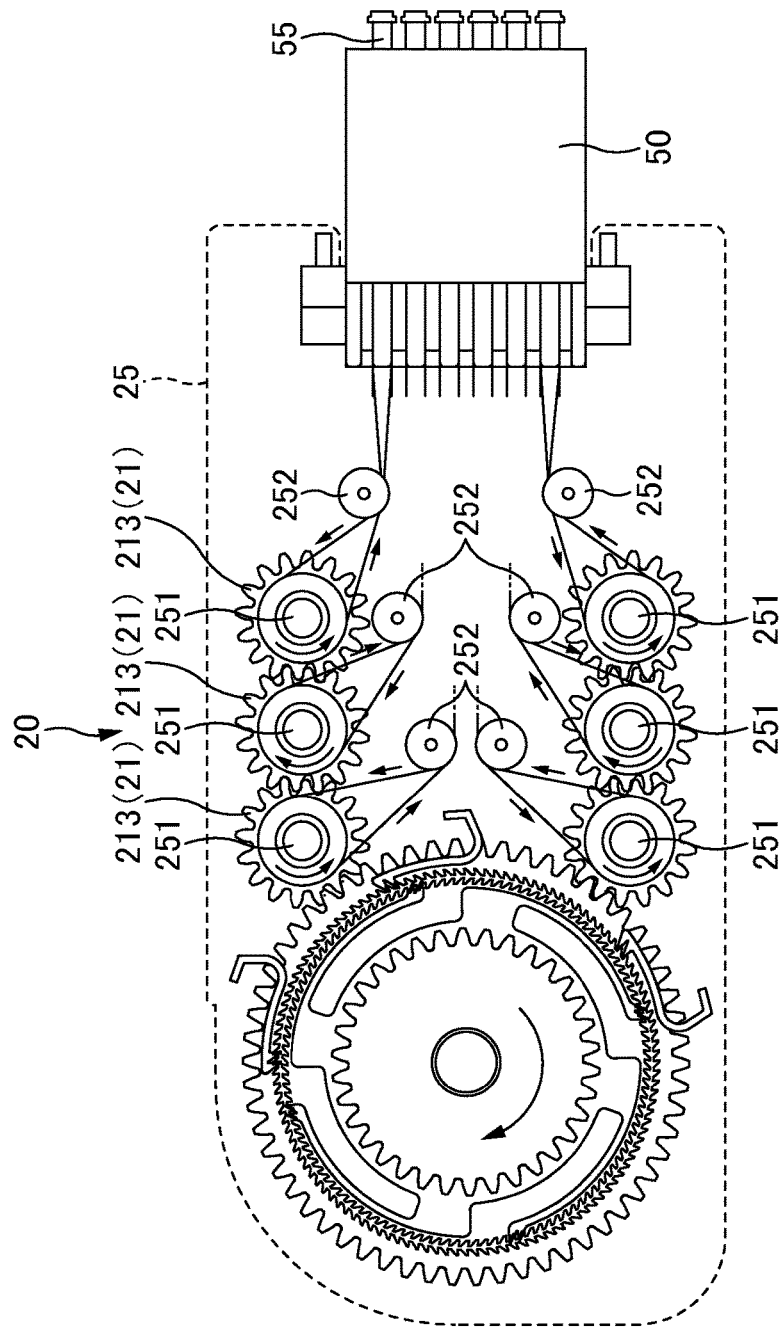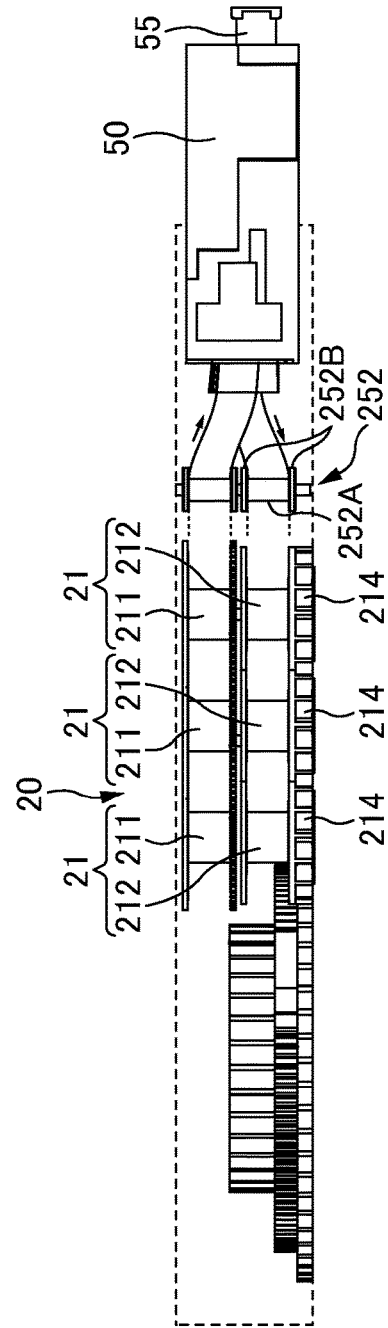

CLEANING TOOL FOR OPTICAL CONNECTOR

TECHNICAL FIELD

The present invention relates to a cleaning tool for an optical connector.

BACKGROUND

Cleaning tools that clean connecting end faces (endfaces of ferrules) of an optical connector are known. Examples of an optical connector to be cleaned by using a cleaning tool of this type include an optical connector (a backplane connector) attached to a backplane board located in the back of a plug-in unit.

In relation to such a cleaning tool that cleans a backplane connector, Patent Literature 1 describes a cleaning tool for an optical connector (refer to FIG. 7 in Patent Literature 1, for example). In the cleaning tool, an optical connector endface cleaning unit is inserted into and connected to a connector hole of a printed-board-side housing, to fit the printed-board-side housing to a backplane-side housing. In this way, the cleaning tool can clean a connecting end face of the optical connector. Patent Literature 2 describes that a board to which a cleaning tool is attached is slid in a guide groove, the cleaning tool including cleaning tapes (cleaning units) each wound around a pressing surface of a corresponding head (refer to FIG. 9 in Patent Literature 2, for example).

PATENT LITERATURE

Patent Literature 1: JP 2002-219421A
Patent Literature 2: JP 2016-4063A

In some backplane connectors as that described in Patent Literature 1, a so-called floating mechanism, which allows the backplane-side housing to move with respect to a backplane board, is provided to accommodate a relative misalignment between the backplane-side housing and the printed-board-side housing that may occur at the time of connecting the optical connector. In this configuration, a housing of a cleaning tool and a housing of a backplane connector are sometimes not able to be easily fitted to each other simply by sliding the cleaning tool fixed to the board in the guide groove as described in Patent Literature 2. The housing of the cleaning tool not being appropriately fitted to the housing of the backplane connector causes the cleaning units of the cleaning tool to become unable to be appropriately pressed against connecting end faces of the backplane connector. Moreover, the cleaning units of the cleaning tool unable to be appropriately pressed against connecting end faces of the backplane connector may similarly occur in a case of fitting to a housing of an optical connector (e.g., an MPO-type optical connector) other than a backplane connector to clean connecting end faces.

SUMMARY

One or more embodiments of the present invention provide a cleaning tool for an optical connector that is easily fittable to or on a housing of an optical connector to be cleaned.

One or more embodiments of the present invention provide a cleaning tool for an optical connector, the cleaning tool comprising: a body part; a substrate to which the body part is to be fixed; and a head unit including a head that presses a cleaning unit against the optical connector and a head housing that houses the head, wherein the head housing is formed to fit to/on a housing of the optical connector, and the head unit is provided to be movable with respect to the substrate.

Other features of the invention are made clear by the following description and the drawings.

According to one or more embodiments of the present invention, it is possible to easily fit a cleaning tool to a housing of an optical connector to be cleaned.

BRIEF DESCRIPTION OF THE DRAWINGS

FIGS. 5A to 5C are explanatory diagrams illustrating states of fitting a head housing 51 of the head unit 50 and a backplane housing 912 of a backplane-side optical connector 91.

FIGS. 8A and 8B are explanatory diagrams illustrating an inside of a body part 20 of the cleaning tool 10.

FIGS. 11A and 11B are explanatory diagrams illustrating an example of the body part 20 not including the connection parts 22.

DETAILED DESCRIPTION

Figure 1:
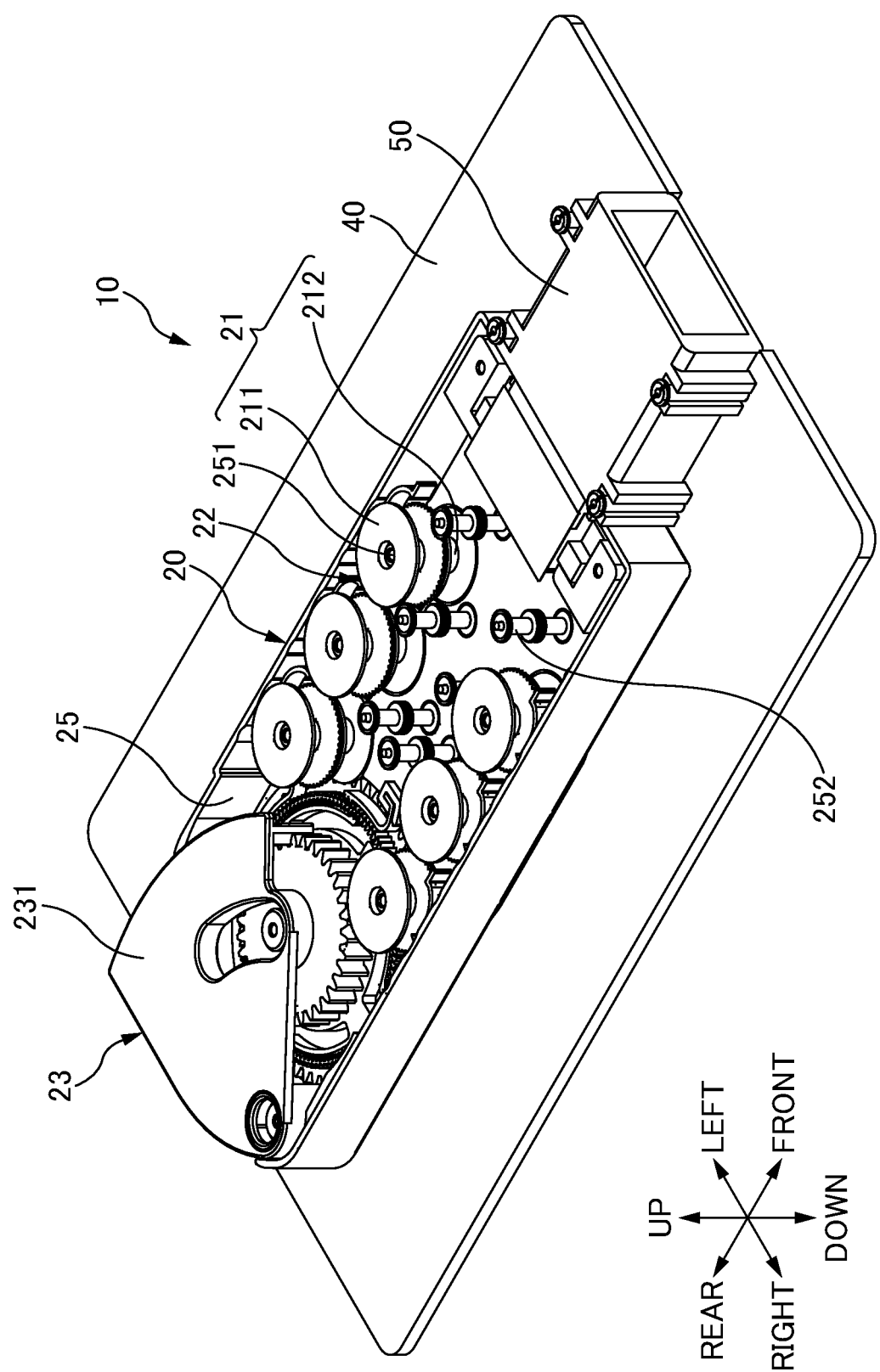
FIG. 1 is a perspective view of a cleaning tool 10 according to one or more embodiments.

At least the following matters are made clear from the following description and the drawings.

A cleaning tool for an optical connector will become clear, the cleaning tool comprising: a body part; a substrate to which the body part is to be fixed; and a head unit including a head that presses a cleaning unit against the optical connector and a head housing that houses the head, wherein the head housing is formed to fit to a housing of the optical connector, and the head unit is provided to be movable with respect to the substrate. According to such a cleaning tool for an optical connector, it is possible to easily fit the cleaning tool to the housing of the optical connector to be cleaned.

The cleaning tool may comprise a stopper mechanism (stopper) that restricts a moving range of the head unit with respect to the substrate. With this, it is possible to prevent the head unit from being detached from the substrate.

The stopper mechanism may include a pile member that is provided to the substrate and a pile receiving part that is provided to the head housing and provided with a gap from the pile member. With this, it is possible to prevent the head unit from being detached from the substrate.

A direction in which the head unit moves with respect to the substrate may be a direction perpendicular to a direction in which the head presses the cleaning unit against the optical connector. With this, it is possible to easily fit the cleaning tool to the housing of the optical connector to be cleaned.

The head unit may be provided to be movable with respect to the body part. With this, it is possible to easily fit the cleaning tool to the housing of the optical connector to be cleaned.

The cleaning tool for an optical connector may further comprise a fixing member that restricts movement of the head unit with respect to the substrate. With this, it is possible to prevent the head unit from moving unnecessarily to pull out cleaning units at the time of transporting the cleaning tool and the like.

The body part may include a plurality of reel units each including a supply reel that supplies the cleaning unit to the head, a take-up reel that takes up the cleaning unit collected from the head, and a rotation shaft that is arranged to allow the supply reel and the take-up reel to rotate, and a drive unit that drives a rotation force for the plurality of reel units; and the drive unit may be provided with a reverse-rotation prevention mechanism that restricts rotation to only one of a direction of supplying the cleaning unit to the head and a direction of taking up the cleaning unit collected from the head. With this, it is enough to provide a reverse-rotation prevention mechanism only to the drive unit and hence possible to reduce the number of components of the cleaning tool.

The body part may include a connection part that transmits a drive force between the plurality of reel units. With this, it is possible to transmit a driving force of the drive unit to the plurality of reel units.

FIG. 1 is a perspective view of a cleaning tool 10 according to one or more embodiments. Note that FIG. 1 illustrates the cleaning tool 10 in a state where a cover part of a body housing 25 is removed to illustrate an inside of a body part 20 of the cleaning tool 10.

In the following description, directions will be defined as illustrated in FIG. 1. Specifically, a direction in which the cleaning tool 10 and an optical connector to be cleaned (not illustrated in FIG. 1; refer to FIG. 2A to FIG. 3 (a backplane-side optical connector 91) to be described later) come close to and come away from each other is a "front-rear direction". The side with the backplane-side optical connector 91 when seen from the cleaning tool 10 is "front" while an opposite side is "rear". An axial direction of each of rotation shafts 251 of the supply reels 211 and the take-up reels 212 is an "up-down direction". The side with the body part 20 when seen from a substrate 40 is "up" while an opposite side is "down". A direction perpendicular to the front-rear direction and the up-down direction is a "left-right direction". The right side when the front side is seen from the rear side is "right" while the left side is "left". The left-right direction, the up-down direction, and the front-rear direction may be referred to as an "X direction", a "Y direction", and a "Z direction", respectively.

The cleaning tool 10 is a tool for cleaning an optical connector. An optical connector to be cleaned by using the cleaning tool 10 according to one or more embodiments is an optical connector (a backplane connector) attached to a connector wall (a midplane or backplane board) located in the back of a plug-in unit. In the following, a structure of a backplane connector to be cleaned will be described first, and thereafter a structure of the cleaning tool 10 according to one or more embodiments will be described.

Figure 2A:
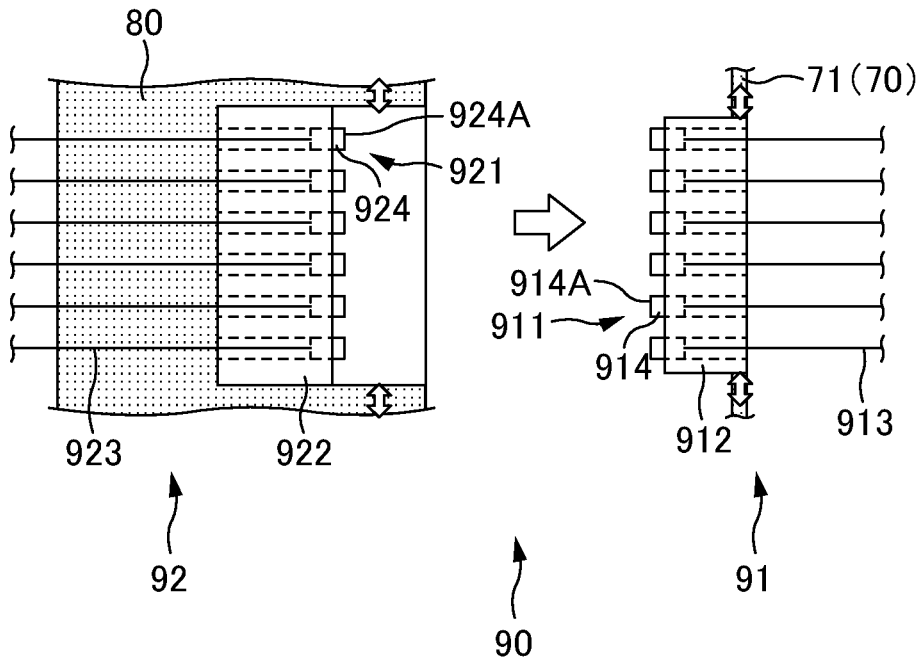
FIGS. 2A and 2B are explanatory diagrams illustrating a structure of a backplane connector 90.
Figure 2B:
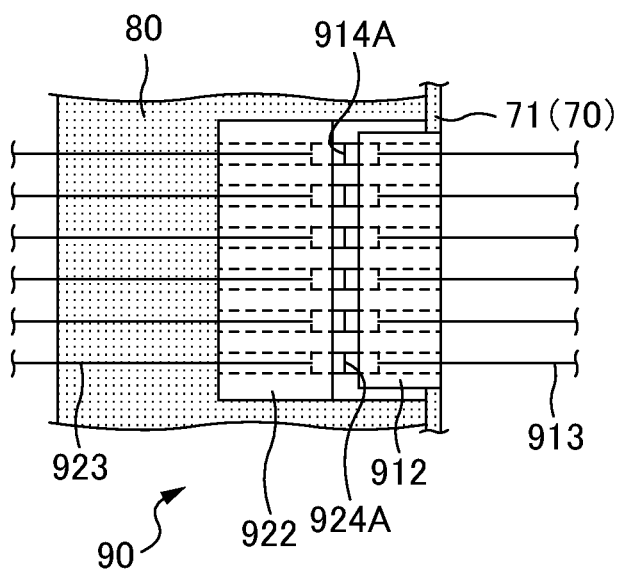

Structure of Backplane Connector 90:

FIGS. 2A to 2B are explanatory diagrams illustrating a structure of a backplane connector 90. The backplane connector 90 includes a backplane-side optical connector 91 and a printed-board-side optical connector 92.

As illustrated in FIG. 2A, the backplane-side optical connector 91 is an optical connector provided to a backplane board 71 side of a plug-in unit 70. The backplane-side optical connector 91 includes a plurality of optical connectors 911 and a backplane housing 912 that houses the plurality of optical connectors 911. Note that, in the backplane-side optical connector 91, the plurality of optical connectors 911 are provided at respective end portions of optical fibers 913.

As illustrated in FIG. 2A, the printed-board-side optical connector 92 is an optical connector provided to a printed board 80 side. The printed-board-side optical connector 92 includes a plurality of optical connectors 921 and a printed-board housing 922. Note that, in the printed-board-side optical connector 92, the plurality of optical connectors 921 are provided at respective end portions of optical fibers 923.

The backplane connector 90 is a plug-in type optical connector forming an optical connector adapter for connecting the plurality of backplane-side optical connectors 911 and the plurality of printed-board-side optical connectors 921. As illustrated in FIG. 2B, the backplane connector 90 optically connects the plurality of optical connectors 911 and the plurality of optical connectors 921 to each other by fitting the printed-board housing 922 attached to a printed board 80 to the backplane housing 912 attached to the backplane board 71 of the plug-in unit 70.

The optical connector 911 provided to the end portion of each of the optical fibers 913 is a connecting component for optically connecting the optical fiber 913 and the corresponding optical fiber 923 to each other through the corresponding optical connector 921. The optical connector 911 includes a ferrule 914 and an optical connector housing (not illustrated). The ferrule 914 is a member that holds the end portion of the optical fiber 913. A ferrule endface 914A of the ferrule 914 serves as a connecting end face of the optical connector 911. In other words, the ferrule endface 914A serves as a connecting end face of the backplane-side optical connector 91.

The optical connector 921 provided to the end portion of each of the optical fibers 923 is a connecting component for optically connecting the optical fiber 923 and the optical fiber 913 to each other through the corresponding optical connector 911. The optical connector 921 includes a ferrule 924 and an optical connector housing (not illustrated). The ferrule 924 is a member that holds the end portion of the optical fiber 923. A ferrule endface 924A of the ferrule 924 serves as a connecting end face of the optical connector 921. In other words, the ferrule endface 924A of the ferrule 924 serves as connecting end face of the printed-board-side optical connector 92.

As illustrated in FIG. 2A and FIG. 2B, when an operator slides and moves the printed board 80 toward a backplane board 71 side (refer to an arrow in FIG. 2A) to fit the printed-board housing 922 to the backplane housing 912, the ferrules 914 of the optical connectors 911 and the ferrules 924 of the optical connectors 921 abut on each other to thereby optically connect the plurality of optical connectors 911 and the plurality of optical connectors 921. In other words, the optical fibers 913 of the plurality of optical connectors 911 and the optical fibers 923 of the plurality of optical connectors 921 are optically connected.

Figure 3:
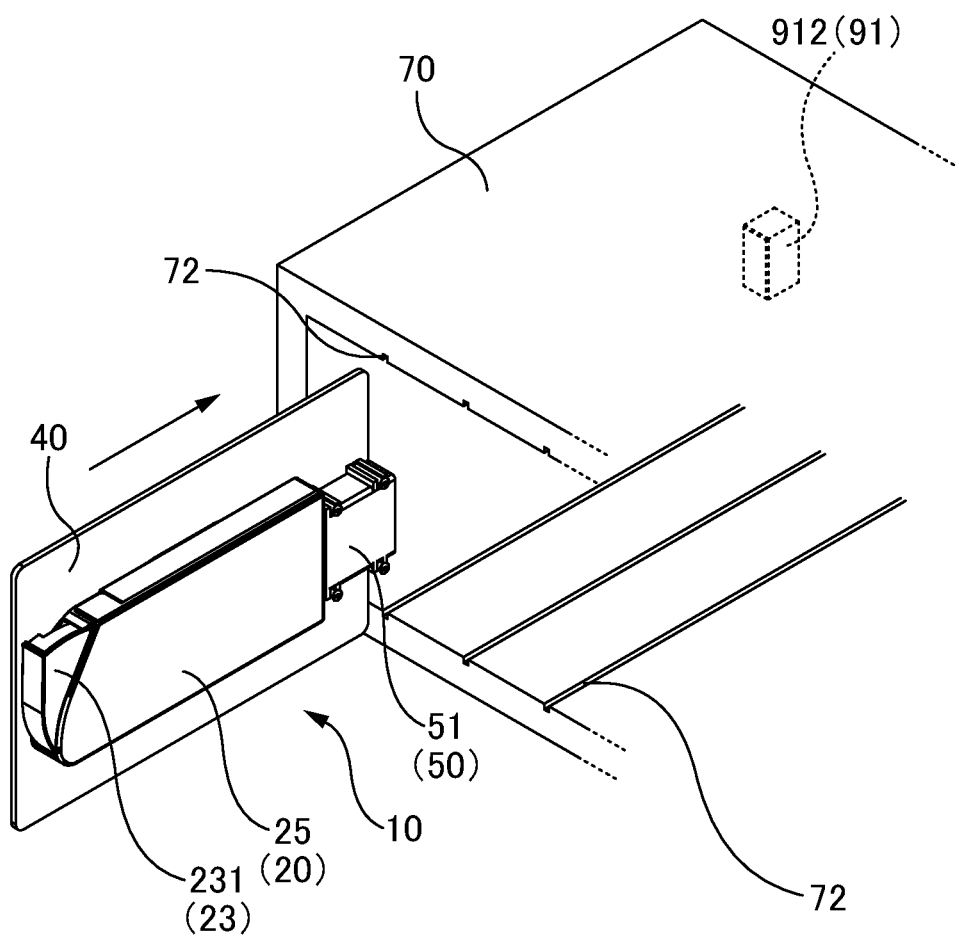
FIG. 3 is an explanatory diagram illustrating the cleaning tool 10 at the time of cleaning according to one or more embodiments.

Basic Structure of Cleaning Tool 10:

FIG. 3 is an explanatory diagram illustrating the cleaning tool 10 according to one or more embodiments at the time of cleaning. In the printed-board-side optical connector 92 described in FIGS. 2A and 2B, the optical connectors 921 are provided to the printed board 80 side. The plurality of optical connectors 911 and the plurality of optical connectors 921 are optically connected by fitting the printed-board housing 922 attached to the printed board 80 to the backplane housing 912 attached to the backplane board 71 of the plug-in unit 70. In the cleaning tool 10 according to one or more embodiments, cleaning units (tape-like cleaning units each wound around a pressing surface of a head) is attached to a substrate instead of the printed board 80. A housing in which the cleaning unit is housed is then fitted to a backplane housing, to thereby press the cleaning units against connecting end faces of a plurality of backplane-side optical connectors and clean the connecting end faces.

As illustrated in FIG. 3, the operator slides and moves the substrate 40 of the cleaning tool 10 along a guide groove 72 of the plug-in unit 70. A head housing 51 of a head unit 50 is then fitted to the backplane housing 912 of the backplane-side optical connector 91. This causes cleaning units 1 (not illustrated in FIG. 3; refer to FIG. 4B to be described later) each wound around a pressing surface of a corresponding head 55 housed in the head unit 50 of the cleaning tool 10, to be pressed against the optical connectors 911 (not illustrated in FIG. 3; refer to FIGS. 2A and 2B) of the backplane-side optical connector 91.

The cleaning tool 10 includes the body part 20, the substrate 40, and the head unit 50 (refer to FIG. 1 and FIG. 3).

The body part 20 is a member that houses members (e.g., reel units 21 to be described later and the like) for supplying and collecting the cleaning units 1 to and from the head unit 50. The body part 20 is also a member that houses a member (the drive unit 23 to be described later) for driving the reel units 21 and the like. As illustrated in FIG. 1, the members (the reel units 21 and the like) for supplying and collecting the cleaning units 1 to and from the head unit 50 are housed in the body housing 25 of the body part 20. A major part of the member (the drive unit 23) for driving the reel units 21 and the like is housed in the body housing 25, but part of the member (part of a drive lever 231) is exposed from the body housing 25 (refer to FIG. 3). Note that the body part 20 is fixed to the substrate 40 to be described later. Details of a structure and operations of the body part 20 will be described later.

The substrate 40 is a member that holds the body part 20 and is also guided in the guide groove 72 of the plug-in unit 70 at the time when the cleaning tool 10 is slid into the plug-in unit 70. The substrate 40 may be formed in the same shape as that of the printed board 80. This allows the substrate 40 to be inserted into the guide groove 72 of the plug-in unit 70.

The head unit 50 is a member that houses heads 55 each having a pressing surface wounded with the cleaning unit 1 and is fitted to the backplane housing 912 of the backplane-side optical connector 91. A detailed structure of the head unit 50 will be described later.

Floating Mechanism;

The backplane connector 90 described in FIGS. 2A and 2B optically connects the plurality of optical connectors 911 and the plurality of optical connectors 921 by fitting the printed-board housing 922 attached to the printed board 80 to the backplane housing 912 attached to the backplane board 71 of the plug-in unit 70. Here, a floating mechanism is sometimes provided to the backplane connector 90 to absorb a relative misalignment between the printed-board housing 922 and the backplane housing 912 at the time of fitting the printed-board housing 922 to the backplane housing 912. In such a floating mechanism, the backplane housing 912 is movable with respect to the backplane board 71 (refer to the arrow in FIG. 2A). The printed-board housing 922 is also movable with respect to the printed board 80 (refer to the arrow in FIG. 2A). With this, even when a relative misalignment occurs at the time of fitting the printed-board housing 922 and the backplane housing 912, the printed-board housing 922, for example, moves with respect to the printed board 80, which can absorb the relative misalignment.

In the cleaning tool 10 according to one or more embodiments, a floating mechanism that allows the head unit 50 to be movable with respect to the substrate 40 is provided. In the following, a detailed structure of the head unit 50 and also the floating mechanism provided to the cleaning tool 10 will be described.

Figure 4A:
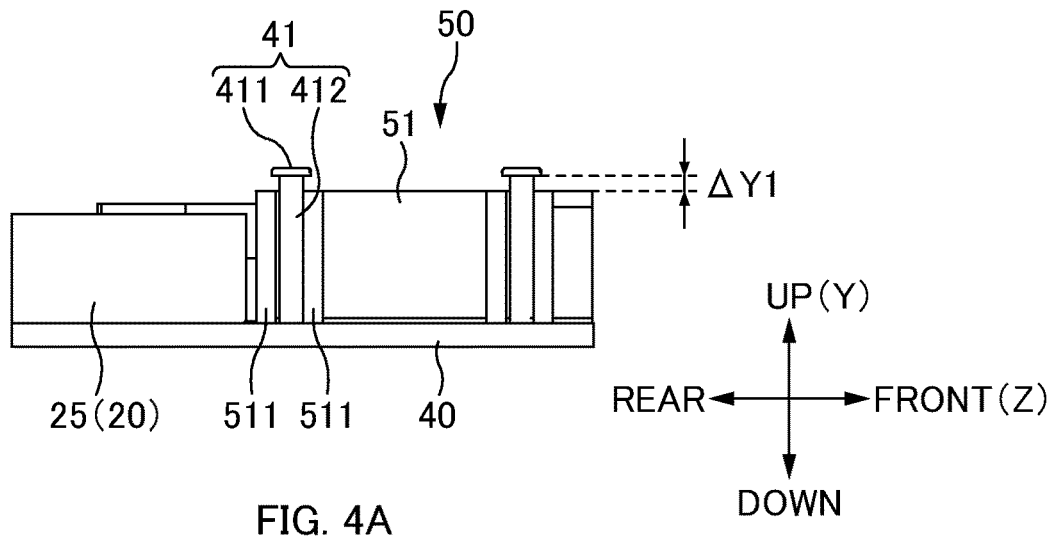
FIG. 4A is an enlarged side view of a portion of a head unit 50 of the cleaning tool 10.
Figure 4B:
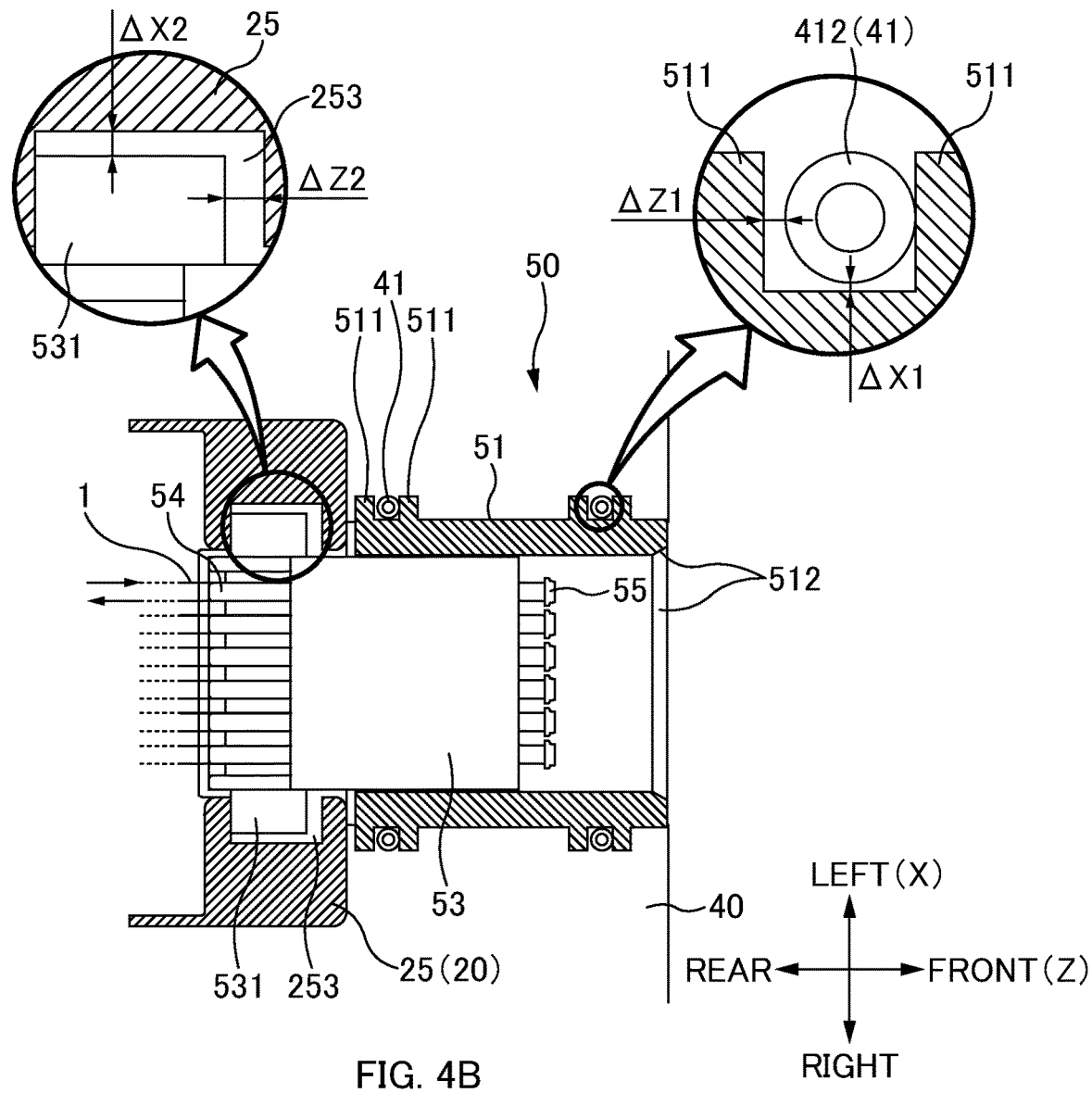
FIG. 4B is an enlarged cross-sectional view of the portion of the head unit 50 of the cleaning tool 10.

FIG. 4A is an enlarged side view of a portion of the head unit 50 of the cleaning tool 10. FIG. 4B is an enlarged cross-sectional view of the portion of the head unit 50 of the cleaning tool 10. Note that a further enlarged view of a pile member 41 and therearound is illustrated upper right in FIG. 4B to describe the pile member 41 and therearound in detail. Similarly, a further enlarged view of a flange part 531 and therearound is illustrated upper left in FIG. 4B to describe the flange part 531 and therearound in detail. In addition, FIG. 4B illustrates a cross section obtained by taking only the body housing 25 and the head housing 51 at a surface perpendicular to the up-down direction, to illustrate the floating mechanism.

The head unit 50 includes the heads 55, a head support part 53, and the head housing 51. Pile members 41 are provided to the substrate 40.

Each of the heads 55 is a member for pressing the cleaning unit 1 against the connecting end face (the ferrule endface 914A) of the corresponding one of optical connectors (backplane-side optical connector 91 or the plurality of optical connectors 911) to be cleaned with the cleaning tool 10. A front endface of the head 55 is a pressing surface for pressing the cleaning unit 1 against the ferrule endface 914A. The cleaning unit 1 is wound around the pressing surface (the front endface of the head 55), and the cleaning unit 1 that is unused is supplied from an upstream side of the pressing surface while the cleaning unit 1 that is used is send out to a downstream side of the pressing surface (refer to arrows in FIG. 4B).

The plurality of (six, here) ferrule endfaces 914A are arranged in the backplane-side optical connector 91, and the head unit 50 includes the plurality of (six, here) heads 55 corresponding to the plurality of respective ferrule endfaces 914A of the backplane-side optical connector 91. This allows the cleaning unit 1 to be supplied and collected on a per head 55 basis. Note that, in the following description, the cleaning unit 1 that is unused being supplied from the upstream side of the pressing surface and the cleaning unit 1 that is used being send out to the downstream side of the pressing surface may be collectively referred to as "transport" of the cleaning unit 1. In addition, a direction in which the cleaning unit 1 is transported may be referred to as a "transport direction".

The head support part 53 is a member that prevents the heads 55 from falling forward while supporting the plurality of heads 55. The head support part 53 is housed in the head housing 51 to be described later. The head support part 53 is fixed to the head housing 51.

The guiding parts 54 are provided on a rear side of the head support part 53. Each of the guiding parts 54 is a part for restricting movement of the cleaning unit 1 of the cleaning tool 10 in other directions than the transport direction during transport while guiding the cleaning unit 1 in the transport direction. A groove part (not illustrated) may be formed in the transport direction of the cleaning unit 1 in a guide surface of the guiding part 54 (a surface of the guiding part 54 to be in contact with the cleaning unit 1). By transporting the cleaning unit 1 using the groove part, a moving range of the cleaning unit 1 in other directions than the transport direction is restricted. Note that a spring (not illustrated) is arranged between the guiding part 54 and the head 55, and the head 55 is pressed forward with the spring. The head support part 53 prevents the heads 55 from falling forward while retractably supporting the heads 55.

The head housing 51 is a member that houses the heads 55 and the head support part 53 and that is fitted to the backplane housing 912 of the backplane-side optical connector 91. The head housing 51 is a tubular member extending in the front-rear direction and houses the heads 55 and the head support part 53 inside thereof having a tubular shape. The head housing 51 may be formed in the same shape as that of the printed-board housing 922 of the printed-board-side optical connector 92. This allows the head housing 51 to be fitted to the backplane housing 912 of the backplane-side optical connector 91.

Pile receiving parts 511 are provided to the head housing 51. Each of the pile receiving parts 511 is a protruding part provided in an outer surface portion of the head housing 51 to extend in the up-down direction. For the pile receiving part 511, a pair of protruding parts is provided in the front-rear direction. Moreover, the pile receiving part 511 is provided to sandwich, between the protruding parts, the corresponding pile member 41 provided to the substrate 40. A plurality of (four, here) pile members 41 are provided to the substrate 40, and the head housing 51 includes a plurality (four pairs, here) of pile receiving parts 511 corresponding to the plurality of respective pile members 41.

Each of the pile members 41 is a rod-like member extending in the up-down direction. The pile member 41 is provided in the corresponding pile receiving part 511 (the corresponding pair of protruding parts). A bottom end (an end portion opposite to a head part 411 side to be described later) of the pile member 41 is fixed to the substrate 40. Thus, the pile member 41 is a member extending and protruding upward from an upper surface (a surface perpendicular to the up-down direction) of the substrate 40. The plurality of (four, here) pile members 41 are provided to the substrate 40. According to one or more embodiments, the pile members 41 and the pile receiving parts 511 are not fixed to each other.

Each of the pile members 41 includes a head part 411 and a trunk part 412.

The head part 411 is an upper part of the pile member 41. The head part 411 is provided so as to protrude upward from upper surfaces of the corresponding pile receiving part 511. Moreover, the head part 411 is formed to have a larger diameter (the size in the direction perpendicular to the up-down direction) than the gap in the pile receiving part 511 (between the pair of protruding parts). With this, it is possible to prevent the head unit 50 from being detached upward with respect to the substrate 40 although the pile members 41 (the substrate 40) and the pile receiving parts 511 (the head unit 50) are not fixed to each other.

The trunk part 412 is a rod-like part positioned below the head part 411. As illustrated in FIG. 4A, an upper portion of the pile member 41 is formed to protrude upward from the upper surfaces of the pile receiving part 511, while the other portion is provided in the pile receiving part 511 (between the pair of protruding parts).

As described above, the pile members 41 and the pile receiving parts 511 are not fixed to each other. Hence, according to one or more embodiments, the substrate 40 provided with the pile members 41 and the head unit 50 provided with the pile receiving parts 511 are not fixed to each other. In addition to this, the pile receiving parts 511 (the head unit 50) are provided to be movable with respect to the pile members 41 (the substrate 40). Specifically, as illustrated in FIGS. 4A and 4B, each of the pile receiving members 511 is provided with a gap of $\Delta X1$ in the X direction and a gap of $\Delta Z1$ in the Z direction from the trunk part 412. In other words, the head unit 50 is provided to be movable with respect to the substrate 40 in the X direction and the Z direction. As illustrated in FIG. 4A, each of the pile members 41 and the head housing 51 are provided with a gap of $\Delta Y1$ between a lower surface of the head part 411 of the pile member 41 and an upper surface of the head housing 51. In other words, the head unit 50 is provided to be movable with respect to the substrate 40 in the Y direction.

In this way, according to one or more embodiments, the floating mechanism for the head unit 50 with respect to the substrate 40 is formed by using the pile members 41 and the pile receiving parts 511. In other words, the head unit 50 is provided to be movable with respect to the substrate 40 three-dimensionally (the X, Y, and Z directions). Note that a movable direction(s) of the head unit 50 with respect to the substrate 40 may be two directions (e.g., the X direction and the Y direction only) or one direction (e.g., the X direction only).

In a case of a floating mechanism in which the head unit 50 moves with respect to the substrate 40 in the X direction and the Y direction only, a relative misalignment in the Z direction can be absorbed by the springs provided between the guiding parts 54 and the heads 55 described above. Specifically, since the plurality of heads 55 of the head unit 50 are supported so as to be retractable by using the springs provided in the head support part 53, the relative misalignment in the Z direction at the time when the head housing 51 and the backplane housing 912 are fitted can be absorbed. However, the amount of relative misalignment in the Z direction between the head housing 51 and the backplane housing 912 may vary among fitting cases. When the relative misalignment is absorbed only by using the springs provided in the head support part 53 as described above, the push-back amounts of the springs vary depending on the amount of relative misalignment to be absorbed in each fitting case. Consequently, the pressure for the cleaning units 1 to be pressed against the connecting end faces (ferrule endfaces 914A) of the backplane-side optical connector 91 varies in each fitting case. The head unit 50 is provided to be movable with respect to the substrate 40 also in the Z direction in addition to the X direction and the Y direction only, and this makes it possible to maintain steady push-back amounts of the springs and to hence maintain a steady pressure for the cleaning units 1.

The head unit 50 not only is provided to be movable with respect to the substrate 40 but also has a movable range restricted to a certain range. Stated differently, the pile members 41 (substrate 40) also constitute a stopper mechanism that restricts the moving range of the head housing 51 (head unit 50) including the pile receiving parts 511. Specifically, X-direction and Z-direction moving ranges are defined by the size of the gaps between the trunk part 412 of each pile member 41 and the pair of protruding parts of the corresponding pile receiving part 511. A Y-direction moving range is defined by the size of the gap between the lower surface of the head part 411 of each pile member 41 and the upper surface of the head housing 51. However, the stopper mechanism may be any that restricts the movable range of the head unit 50 with respect to the substrate 40, without being limited to the pile members 41 and the pile receiving parts 511. With such a stopper mechanism, it is possible to prevent the head unit 50 from being detached from the substrate 40.

In the above-described floating mechanism, the head unit 50 is provided to be movable with respect to the substrate 40. In the floating mechanism according to one or more embodiments, the head unit 50 may be provided to be movable with respect to the body part 20.

As illustrated in FIG. 4B, flange parts 531 are provided to the head support part 53. The flange parts 531 are parts that stick out from the head support part 53 on the left and right of the head support part 53. The body housing 25 of the body part 20 is, in contrast, provided with recessed parts 253 that house the respective flange parts 531. As illustrated in FIG. 4B, a certain gap of ΔX2 in the X direction and a gap of ΔZ2 in the Z direction are provided between the flange part 531 and the recessed part 253. In other words, the head support part 53 (the head unit 50) is provided to be movable with respect to the body housing 20 (the body part 20) in the X direction and the Z direction within a certain range. A certain gap (not illustrated) of ΔY2 may be provided in the Y direction between the flange part 531 and the recessed part 253. In other words, the head support part 53 (the head unit 50) is provided to be movable with respect to the body housing 20 (the body part 20) in the Y direction within a certain range. Thus, the head unit 50 is provided to be movable with respect to body part 20 three-dimensionally (the X, Y, and Z directions). Note that the gaps (ΔΔX2, ΔY2, and ΔZ2) between the flange parts 531 and the recessed parts 253 are provided so as to be greater than the above-described respective movable ranges (ΔX1, ΔY1, and ΔZ1) between the pile members 41 (the substrate 40) and the pile receiving parts 511 (the head unit 50) (ΔX2>ΔX1, ΔY2>ΔY1, and ΔZ2>ΔZ1). With this, the moving range between the pile members 41 (the substrate 40) and the pile receiving parts 511 (the head unit 50) are not restricted, and hence move of the head unit 50 with respect to the substrate 40 is not restricted.

As described above, the floating mechanism of the cleaning tool 10 according to one or more embodiments includes two floating mechanisms, i.e., a mechanism in which the head unit 50 is provided to be movable with respect to the substrate 40 and a mechanism in which the head unit 50 is provided to be movable with respect to the body part 20. However, the floating mechanism may include only the mechanism in which the head unit 50 is provided to be movable with respect to the body part 20.

FIGS. 5A to 5C are explanatory diagrams illustrating states of fitting the head housing 51 of the head unit 50 and the backplane housing 912 of the backplane-side optical connector 91. In the following, description is given of operations of the floating mechanism at the time of fitting the head housing 51 of the head unit 50 and the backplane housing 912 of the backplane-side optical connector 91.

FIG. 5A illustrates a state before the head housing 51 and the backplane housing 912 are fitted to each other. As described above, to fit the head housing 51 of the head unit 50 to the backplane housing 912 of the backplane-side optical connector 91, the operator causes the substrate 40 of the cleaning tool 10 to slide and move along the guide groove 72 of the plug-in unit 70 (refer to an arrow in FIG. 5A).

FIG. 5B illustrates a state when the head housing 51 and the backplane housing 912 start to be fitted to each other. FIG. 5B illustrates a state when the substrate 40 is caused to slide along the guide groove 72 of the plug-in unit 70, so that an edge of a front surface (on a backplane housing 912 side) of the head housing 51 abuts on an edge of a rear surface (a surface on a head housing 51 side) of the backplane housing 912. Here, even when a relative misalignment has occurred at the time of fitting the head housing 51 and the backplane housing 912 to each other, the head housing 51 (the head unit 50) moves with respect to the substrate 40 in the cleaning tool 10 according to one or more embodiments, which can absorb the relative misalignment. In other words, the cleaning tool 10 can be easily fitted to the backplane-side optical connector 91 to be cleaned. Moreover, at the time of the fitting, the head housing 51 and the backplane housing 912 are aligned with each other.

A tapered part 912A may be formed at edge portion of a rear surface (a surface on the head housing 51 side) of the backplane housing 912. In contrast to this, according to one or more embodiments, a tapered part 512 is also formed in a front surface (on a backplane housing 912 side) of the head housing 51 so as to face the tapered part 912A. An upper left portion in FIG. 4B illustrates a state where the tapered part 512 of the head housing 51 abuts on the tapered part 912A of the backplane housing 912. When the substrate 40 is further slid along the guide groove 72 from this state (the cleaning tool 10 is moved toward the backplane-side optical connector 91), tapered surfaces (the tapered part 512 and the tapered part 912A) can move in a sliding manner. In this move, since the head housing 51 (the head unit 50) is movable with respect to the substrate 40 as described above, the head housing 51 (the head unit 50) moves upward with respect to the substrate 40 from an abutting state in the upper left portion of FIG. 4B, so that the head housing 51 (the head unit 50) can fit to the backplane housing 912.

FIG. 5C illustrates a state where fitting of the head housing 51 and the backplane housing 912 is completed and the cleaning units 1 are pressed against the ferrule endfaces 914A of the plurality of optical connectors 911 of the backplane-side optical connector 91. At the time of pressing the cleaning units 1 against the ferrule endfaces 914A, the head housing 51 and the backplane housing 912 are aligned with each other in the front-rear direction. When the drive unit 23 is driven in this state, the cleaning units 1 are transported to clean the ferrule endfaces 914A. With the floating mechanism in the cleaning tool 10 according to one or more embodiments, the cleaning units 1 of the cleaning tool 10 can be appropriately pressed against the ferrule endfaces 914A of the backplane-side optical connector 91. Operations of the body part 20 including the drive unit 23 will be described later.

Figure 6A:
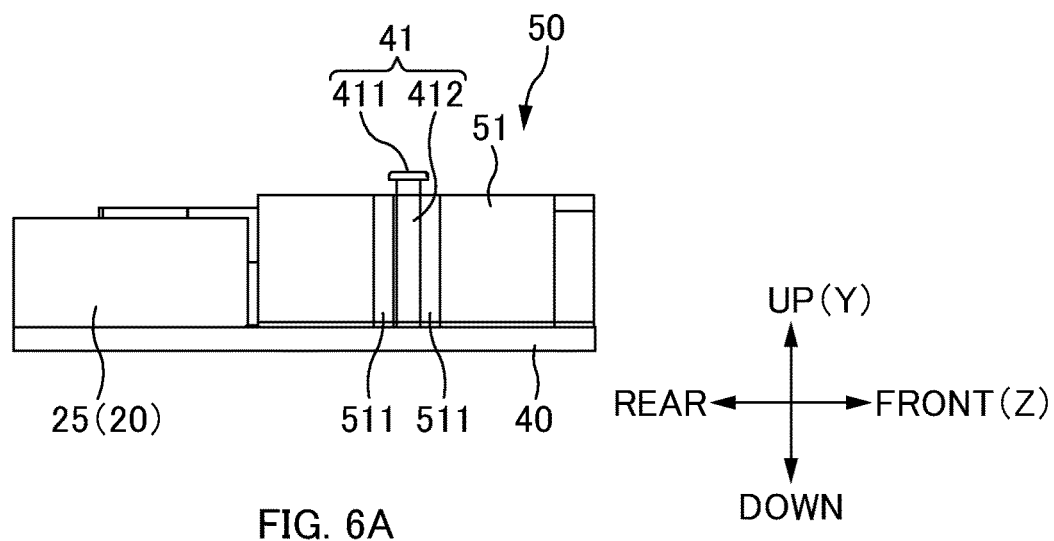
FIG. 6A is an enlarged side view of a portion of a modified example of the head unit 50.
Figure 6B:
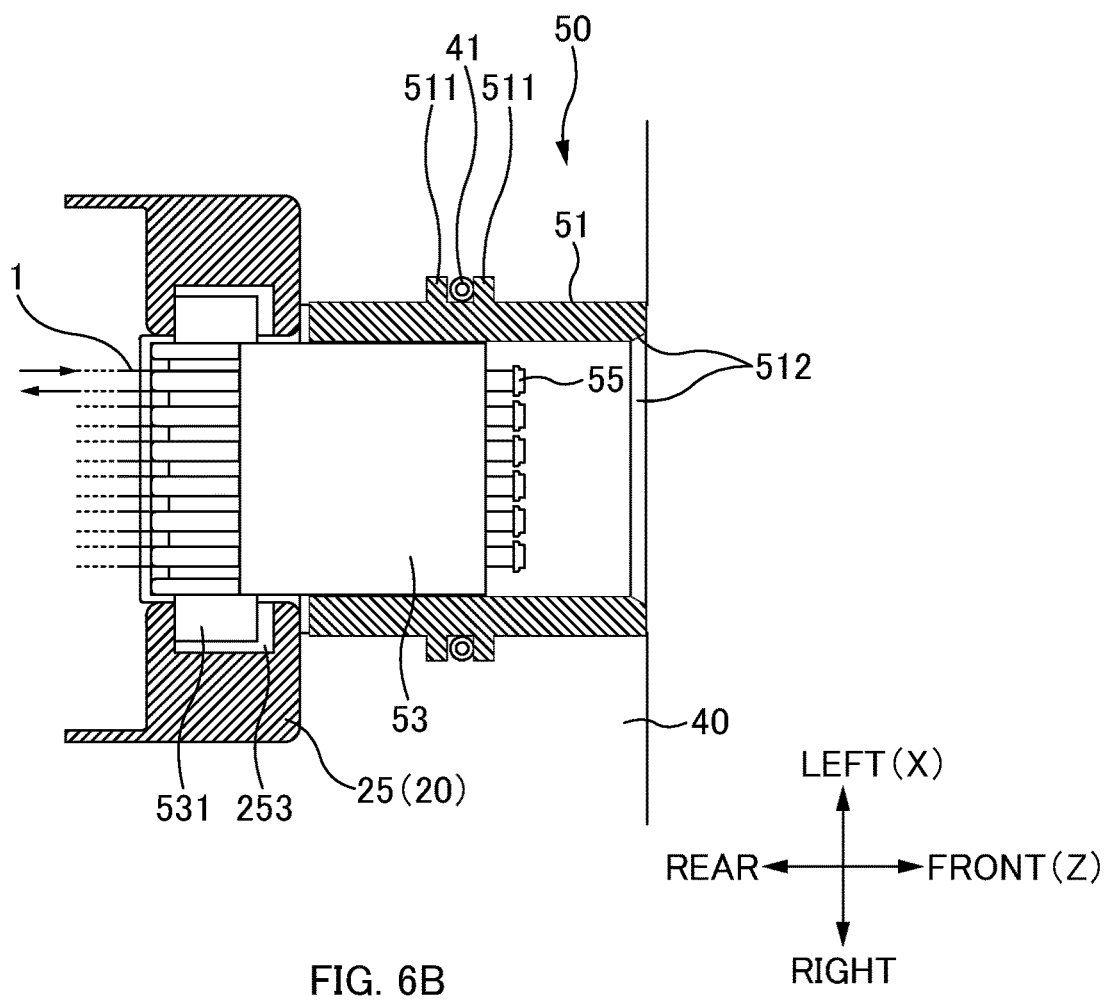
FIG. 6B is an enlarged cross-sectional view of the portion of the modified example of the head unit 50.

Modified Examples of Floating Mechanism:

FIG. 6A is an enlarged side view of a part of a modified example of the head unit 50. FIG. 6B is an enlarged cross-sectional view of the part of the modified example of the head unit 50. In the previously described floating mechanism, four pile members 41 are provided to the substrate 40, and the head housing 51 includes four pairs of pile receiving parts 511 corresponding to the plurality of respective pile members 41. However, the number of pile members 41 (and the number of the corresponding pile receiving parts 511) is not limited thereto. As illustrated in FIGS. 6A and 6B, two pile members 41 may be provided to the substrate 40 (one for each of left and right portions of the head housing 51), and the head housing 51 may include two pairs of pile receiving parts 511 corresponding to the plurality of respective pile members 41 (one pair for each of left and right).

Note that the pile members 41 need not be rod-like members. For example, the pile members 41 may be plate-like members provided along side surfaces of the head unit 50. Also in this case, the head housing 51 (the head unit 50) including the pile receiving parts 511 can be provided to be movable with respect to the pile members 41 (the substrate 40) within a certain range in the front-rear direction, the left-right direction, and the up-down direction.

Figure 7:
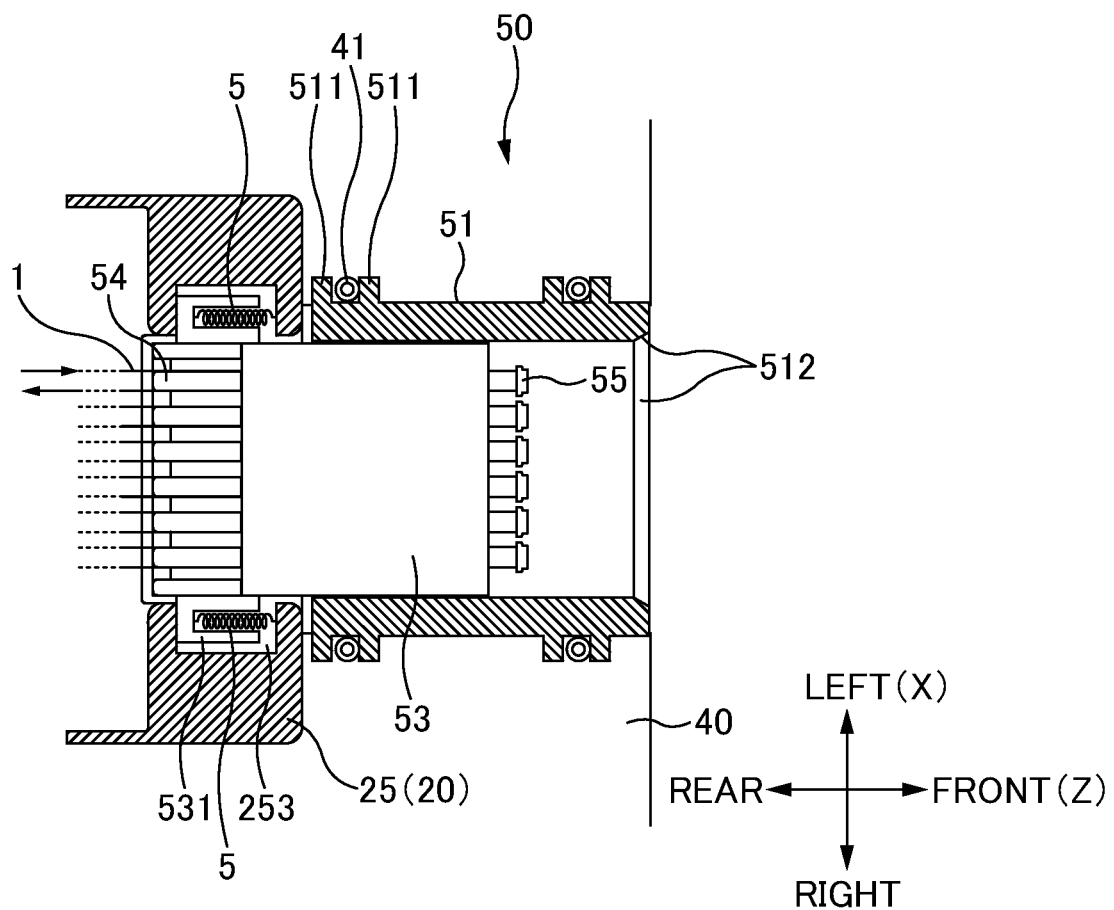
FIG. 7 is an enlarged cross-sectional view of a portion of the head unit 50 to which fixing members 5 are attached.

FIG. 7 is an enlarged cross-sectional view of a portion of the head unit 50 to which fixing members 5 are attached. As described above, the head unit 50 is provided to be movable with respect to the substrate 40. In a case that the head unit 50 is movable with respect to the substrate 40, the heads 55 of the head unit 50 are also movable with respect to the substrate 40. In this case, the cleaning units 1 wound around the respective pressing surfaces of the heads 55 may be unnecessarily pulled out due to vibrations at the time of transport and the like and consequently be sagged. To address this, according to one or more embodiments, the fixing members 5 may be included which restrict movement of the head unit 50 with respect to the substrate 40. As illustrated in FIG. 7, the fixing members 5 are spring-like members arranged in a space between the flange part 531 of the head support part 53 and the body housing 25. However, the fixing members 5 may be any that restrict movement of the head unit 50 with respect to the substrate 40, without being limited to the spring-like members. With this, it is possible to prevent the head unit from moving unnecessarily to pull out a cleaning unit at the time of transporting the cleaning tool and the like. Note that, even in a state where the fixing members 5 are attached, the spring-like members are deformable and hence the head unit 50 is movable with respect to the substrate 40 by a force being applied against an elastic force.

Figure 9A:
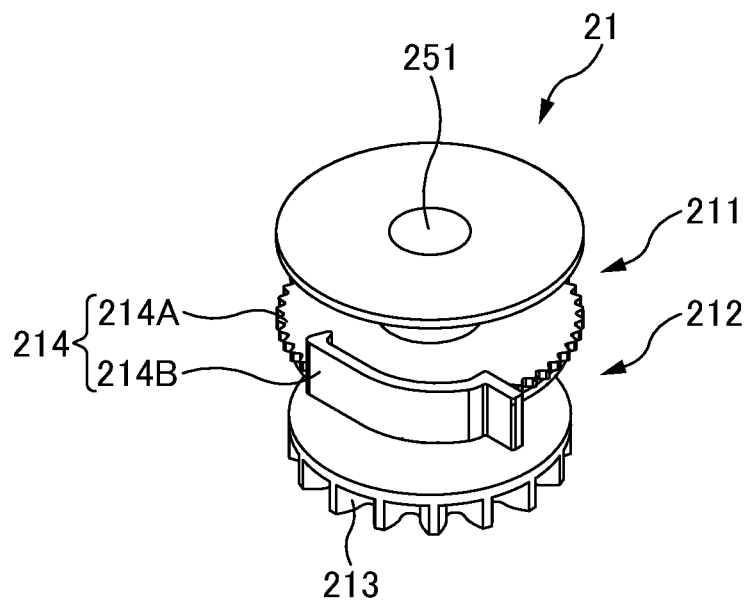
FIG. 9A is a perspective view of a reel unit 21 of the body part 20.
Figure 9B:
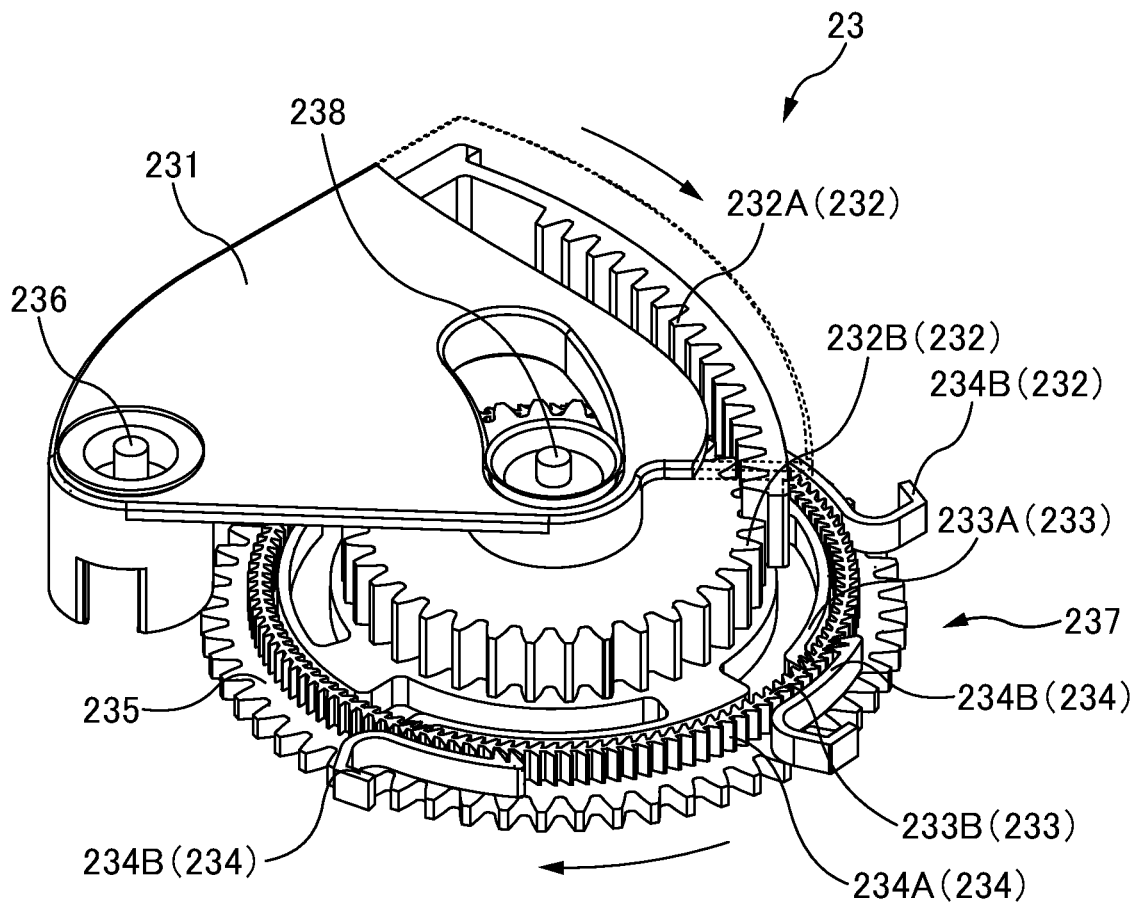
FIG. 9B is a perspective view of a drive unit 23 of the body part 20.

Transport Mechanism:

FIGS. 8A and 8B are explanatory diagrams illustrating an inside of the body part 20 of the cleaning tool 10. FIG. 9A is a perspective view of a reel unit 21 of the body part 20. FIG. 9B is a perspective view of the drive unit 23 of the body part 20. Note that FIG. 9B illustrates the drive lever 231 partially cut out to describe an inner shape (a conversion mechanism 232) of the drive lever 231. An outer shape of the cut-out portion of the drive lever 231 is indicated by broken lines.

The cleaning tool 10 according to one or more embodiments presses the cleaning units 1 against the ferrule endfaces 914A of the plurality of optical connectors 911 of the backplane-side optical connector 91 to thereby clean the ferrule endfaces 914A. By transporting each of the cleaning units 1, the cleaning unit 1 that is unused is supplied from the upstream side of the pressing surface while the cleaning unit 1 that is used is sent out to the downstream side of the pressing surface. In the following description, a transport mechanism for transporting the cleaning units 1 in the body part 20 will be described in detail.

The body part 20 includes the body housing 25, the reel units 21, connection parts 22, and the drive unit 23. Note that the body housing 25 is illustrated by broken lines in FIG. 8A.

The body housing 25 is a member (cover) for housing the reel units 21, the connection parts 22, and the drive unit 23. Note that part of the drive lever 231 of the drive unit 23 is exposed from the body housing 25 to be operable with a finger by the operator (refer to FIG. 3).

The body housing 25 is provided with rotation shafts 251 that rotatably support the respective reel units 21. The rotation shafts 251 are arranged in parallel with a width direction of the cleaning units 1. The body housing 25 is also provided with driven rollers 252 each of which guides, when the cleaning unit 1 is transported between the reel units 21 and the head unit 50, the cleaning unit 1 while being driven to rotate. The driven roller 252 includes a shaft part 252A and a pair of flange parts 252B. The shaft part 252A is a part that is in contact with the cleaning unit 1. The flange parts 252B are edge parts (protruding edge part) that stick out from the shaft part 252A at the both ends of the shaft part 71. With the driven roller 252 including the flange parts 252B, it is possible to prevent the cleaning unit 1 from being detached from the shaft part 252A.

The reel unit 21 is a unit including a reel (a cylindrical spool) for supplying the cleaning unit 1 and also taking up the cleaning unit 1 (refer to FIG. 9A). The cleaning tool 10 according to one or more embodiments includes six heads 55. The reel units 21 are provided to correspond to the six respective heads 55 and are each a unit for supplying and collecting the cleaning unit 1 to and from the corresponding head 55. Each of the reel units 21 includes a supply reel 211 and a take-up reel 212. According to one or more embodiments, the supply reel 211 and the take-up reel 212 of each of the reel units 21 are arranged so as to be rotatable about the shared rotation shaft 251. With this, it is possible, in comparison with a case that each of the reel units 21 is provided with a rotation shaft of the supply reel 211 and the rotation shaft of the take-up reel 212 separately, to reduce the area of the cleaning tool 10 in the surface perpendicular to the rotation shaft 251, and consequently to reduce the size of the cleaning tool 10.

Each reel unit 21 is housed in the body housing 25. The supply reel 211 and the take-up reel 212 constituting each of the reel units 21 are housed in the body housing 25 while being arranged side by side in the width direction of the cleaning unit 1.

The supply reel 211 is a reel for supplying the cleaning unit 1. The cleaning unit 1 that is not used is wound around the supply reel 211 in advance. The supply reel 211 is rotatably supported by the rotation shaft 251 of the body housing 25. When the cleaning unit 1 is pulled from a head 55 side, the supply reel 211 rotates with a tension of the cleaning unit 1, so that the cleaning unit 1 is supplied from the supply reel 211.

Note that, when the cleaning unit 1 is supplied from the supply reel 211, the cleaning unit 1 may sag due to the supply reel 211 rotating too much. To prevent such over-rotation of the supply reel 211, a rotation prevention mechanism 214 is provided as illustrated in FIG. 9A. The rotation prevention mechanism 214 includes engagement teeth 214A that are provided at an outer ring of the supply reel 211 and a catch pawl 214B that is attached to the body housing 25 and catches any of the engagement teeth 214A. Note that the rotation prevention mechanism 214 may be any mechanism that can prevent over-rotation of the supply reel 211 and is hence not limited to this structure.

The take-up reel 212 is a reel for taking up the cleaning unit 1. The cleaning unit 1 that is used is taken up by the take-up reel 212. The take-up reel 212 is rotatably supported by the rotation shaft 251 of the body housing 25. When the take-up reel 212 rotates, the cleaning unit 1 is taken up by the take-up reel 212.

A rotation part 213 is provided below the take-up reel 212. The rotation part 213 is a member that rotates the take-up reel 212 with a rotation force received from a drive part 233 (or a connection part 22) to be described later. The rotation part 213 is also a member that transfers a rotation force to the connection part 22. The rotation part 213 rotates integrally with the take-up reel 13. Note that the rotation part 213 is formed as a gear wheel that engages with the drive part 233 or the connection part(s) 22.

Each of the connection parts 22 is a member for transferring a rotation force between a plurality of corresponding reel units 21. The connection part 22 transfers a rotation force between two pairs of reel units 21 according to one or more embodiments. Note that the connection part 22 is formed as a gear that engages with the connection parts 22.

The drive unit 23 is a member that generates a driving force (rotation force) for taking up the cleaning units 1 around the take-up reels 212 of the reel units 21 (refer to FIG. 9B). In the following, a drive mechanism for generating a driving force (rotation force) for taking up the cleaning units 1 with the take-up reels 212 will be described. As the drive mechanism for generating a drive force (rotation force) for the take-up reels 212, the drive unit 23 includes a conversion mechanism 232, a transmission mechanism 233, and a reverse-rotation prevention mechanism 234.

The conversion mechanism 232 is a mechanism that converts a rotary motion within a certain angle with a drive lever rotation shaft 236 of the drive lever 231 as a center (sometimes referred to as an "arcuate motion" below), into a rotary motion of the drive part 237 of the drive lever 231. Note that the arcuate motion of the drive lever 231 also includes a rotary motion in which clockwise and counterclockwise rotary motions are reciprocated (swing motion). According to one or more embodiments, the conversion mechanism 232 is constituted of a rack-and-pinion mechanism and includes a rack 232A and a pinion 232B. The rack 232A is a gear provided on the inner side of an arc portion of the drive lever 231 and performs an arcuate motion with the drive lever rotation shaft 236 as a center (refer to an arrow in FIG. 9B). The pinion 232B is a circular gear provided on a drive part 237 side. When the rack 232A performs an arcuate motion, the pinion 232B performs a rotary motion with the drive part rotation shaft 238 as a center.

The transmission mechanism 233 is a mechanism that transmits the rotary motion of the pinion 232B for a rotary motion of a transmission wheel 235. The transmission mechanism 233 includes a transmission pawl 233A and an engagement wheel 233B. The transmission pawl 233A is a member that rotates while being engaged with the engagement wheel 233B to thereby transmit a rotation force to the engagement wheel 233B. The transmission pawl 233A is provided integrally with the pinion 232B, and hence the transmission pawl 233B rotates together with rotation of the pinion 232B. The engagement wheel 233B is a member that engages with the transmission pawl 233A and receives a rotation force from the transmission pawl 233A. The engagement wheel 233B is provided integrally with the pawl wheel 234A of the reverse-rotation prevention mechanism 234 to be described later and the transmission wheel 235.

The reverse-rotation prevention mechanism 234 is a mechanism that restricts a rotation direction of the transmission wheel 235 (a direction in which the take-up reels 212 take up the cleaning units 1) to one direction. In other words, the reverse-rotation prevention mechanism 234 is a mechanism that prevents the transmission wheel 235 from transmitting a drive force in such a manner that the take-up reels 212 rotate in a reverse direction of the take-up direction in which the cleaning units 1 are taken up.

According to one or more embodiments, the reverse-rotation prevention mechanism 234 is constituted of a ratchet mechanism and includes a non-return pawl 234B that is attached to the body housing 25 of the body part 20 and the pawl wheel 234A (ratchet) that is provided integrally with the transmission wheel 235. When a drive force is transmitted in such a manner that the take-up reels 212 rotate in the take-up direction in which the cleaning units 1 are taken up, the non-return pawl 234B allows the pawl wheel 234A to rotate, and thereby the transmission wheel 235 rotates. When a drive force is transmitted in such a manner that the take-up reels 212 rotate in the reverse direction of the take-up direction in which the cleaning units 1 are taken up, the non-return pawl 234B catches the pawl wheel 234A, and thereby the transmission wheel 235 rotates. Note that, although the reverse-rotation prevention mechanism 234 according to one or more embodiments is formed of an external-tooth ratchet mechanism, the reverse-rotation prevention mechanism 234 may be formed of an inner-tooth ratchet mechanism or any mechanism other than the ratchet mechanism as long as it is a mechanism that can prevent a reverse rotation of the drive part 237.

Hence, in the cleaning tool 10 according to one or more embodiments, the rack 232A and the pinion 232B are included as the drive mechanism that generates a drive force (rotation force) for the transmission wheel 235 transmitting such as a rotation to take up the cleaning units 1 around the take-up reels 212. In addition, the transmission pawl 233A and the engagement wheel 233B are included as the transmission mechanism that transmits a rotation force generated at the pinion 232B to the transmission wheel 235. The transmission wheel 235 is provided integrally with the engagement wheel 233B and hence rotates together with rotation of the engagement wheel 233B. According to one or more embodiments, the transmission wheel 235 is provided to transmit a rotation force to the rotation parts 213 formed integrally with the take-up reels 212. Moreover, through the connection parts 22, driving forces (rotation forces) are generated in the six take-up reels 212 in total. In other words, the transmission wheel 235 is shared by the six take-up reels 212. In this way, it is possible, in comparison with a case that the reverse-rotation prevention mechanism 234 is provided for each of the take-up reels 212, to reduce the area of the cleaning tool 10 with respect to the surface perpendicular to the rotation shaft 251, and consequently to reduce the size of the cleaning tool 10.

Figure 10A:
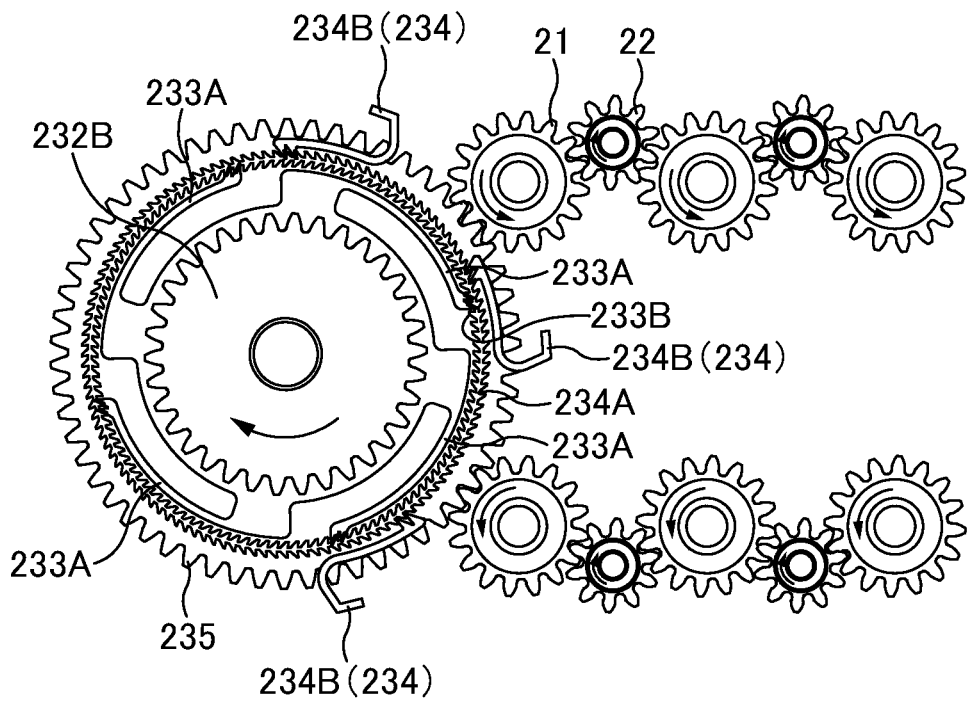
FIG. 10A is an explanatory diagram illustrating a state of reel units 21 and connection parts 22 (connectors) at the time when a drive part 233 of the drive unit 23 normally rotates.
Figure 10B:
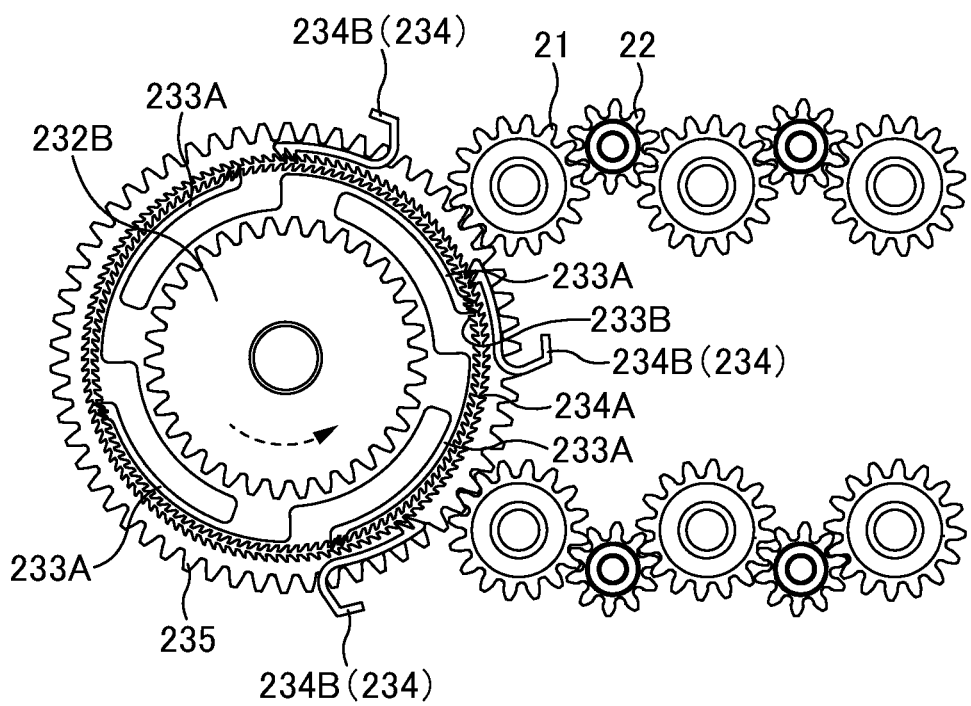
FIG. 10B is an explanatory diagram illustrating a state of the reel units 21 and the connection parts 22 at the time when the drive part 233 of the drive unit 23 reversely rotates.

FIG. 10A is an explanatory diagram illustrating a state of the reel units 21 and the connection parts 22 at the time when the drive part 233 of the drive unit 23 normally rotates. FIG. 10B is an explanatory diagram illustrating a state of the reel units 21 and the connection parts 22 at the time when a drive part 233 of the drive unit 23 reversely rotates. Here, rotation (here, clockwise rotation) of the transmission wheel 235 that drives rotation of the take-up reels 212 to take up the cleaning units 1 may be referred to as "normal rotation", while rotation (here counterclockwise rotation) opposite to the "normal rotation" may be referred to as "reverse rotation".

As illustrated in FIG. 10A, in a push operation at the time of cleaning, the rack 232A of the drive lever 231 rotates clockwise with respect to the pinion 232B, and the pinion 232B rotates clockwise in FIG. 10A. Moreover, the transmission pawl 233A provided to the pinion 232B transmits a rotation force to the engagement wheel 233B (and the transmission wheel 235 provided integrally with the engagement wheel 233). Here, since the ratchet mechanism allows clockwise rotation of the transmission wheel 235, this further transmits a rotation force of the transmission wheel 235 to the take-up reels 212, so that the take-up reels 212 rotate in a take-up direction. The other take-up reels 212 also rotate in the take-up direction through the connection parts 22. Consequently, the cleaning units 1 that are used are taken up by the take-up reels 212 and also the cleaning units 1 that are not used and have a length corresponding to a taken-up length of the cleaning units 1 are supplied from the supply reels 211.

In contrast, as illustrated in FIG. 10B, in a pull operation at the time of cleaning, the rack 232A of the drive lever 231 rotates counterclockwise with respect to the pinion 232B, and the pinion 232B thereby rotates counterclockwise in FIG. 10B. At this time, the transmission pawl 233A provided to the pinion 232B does not transmit any rotation force to the engagement wheel 233B (and the transmission wheel 235 provided integrally with the engagement wheel 233). Since counterclockwise rotation of the transmission wheel 235 is prevented by the reverse-rotation prevention mechanism 234, sliding occurs between the transmission pawl 233A and the engagement wheel 233B of the transmission mechanism 233, which causes the engagement wheel 233B (and the transmission wheel 235 provided integrally with the engagement wheel 233) to turn free, to consequently prevent the transmission wheel 235 from rotating.

Modified Example of Body Part 20:

FIGS. 11A and 11B are explanatory diagrams illustrating an example of the body part 20 not including the connection parts 22. In the body part 20 of the cleaning tool 10 described above, the connection parts 22 are provided as members that transmit a rotation force between each two pairs of reel units 21. However, as illustrated in FIGS. 11A and 11B, each two pairs of reel units 21 may directly transmit a rotation force without the connection parts 22 being provided. Specifically, a rotational force may be transmitted between the rotation parts 213 without any intervention. In this way, it is possible, in comparison with a case of including the connection parts 22, to further reduce the area of the cleaning tool 10 with respect to the surface perpendicular to the rotation shaft 251, and consequently to reduce the size of the cleaning tool 10.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Cleaning unit;
5: Fixing member;
10: Cleaning tool;
20: Body part;
21: Reel unit;
211: Supply reel;
212: Take-up reel;
213: Rotation part;
214: Rotation prevention mechanism;
214A: Engagement tooth;
214B: Catch pawl;
22: Connection part;
23: Drive unit;
231: Drive lever;
232: Conversion mechanism;
232A: Rack;
232B: Pinion;
233: Transmission mechanism;
233A: Transmission pawl;
233B: Engagement wheel;
234: Reverse-rotation prevention mechanism;
234A: Pawl wheel;
234B: Non-return pawl;
235: Transmission wheel;
236: Drive lever rotation shaft;
237: Drive part;
238: Drive part rotation shaft;
25: Body housing;
251: Rotation shaft;
252: Driven roller;
252A: Shaft part;
252B: Flange part;
253: Recessed part;
40: Substrate;
41: Pile member;
411: Head part;
412: Trunk part;
50: Head unit;
51: Head housing;
511: Pile receiving part;
512: Tapered part;
53: Head support part:
531: Flange part;
54: Guiding part;
55: Head;
70: Plug-in unit;
71: Backplane board;
72: Guide groove;
80: Printed board;
90: Backplane connector;
91: Backplane-side optical connector;
911: Optical connector;
912: Backplane housing;
912A: Tapered part;
913: Optical fiber;
914: Ferrule;
914A: Ferrule endface;
92: Printed-board-side optical connector;
921: Optical connector;
922: Printed-board housing;
923: Optical fiber;
924: Ferrule;
924A: Ferrule endface.

The invention claimed is:

1. A cleaning tool for an optical connector, the cleaning tool comprising:
   a body part;
   a substrate to which the body part is fixed;
   a head unit that comprises:
      a head that presses a cleaning unit against the optical connector; and
      a head housing that houses the head; and
   a stopper that restricts a moving range of the head unit with respect to the substrate, wherein the head housing fits on a housing of the optical connector, the head unit moves with respect to the substrate, and the stopper comprises:
- a pile member that is disposed on the substrate; and
- a pile receiving part disposed on the head housing and with a gap between the pile member.

2. The cleaning tool according to claim 1, wherein a direction in which the head unit moves with respect to the substrate is perpendicular to a direction in which the head presses the cleaning unit against the optical connector.

3. The cleaning tool according to claim 1, wherein the head unit moves with respect to the body part.

4. The cleaning tool according to claim 1, further comprising:
- a fixing member that restricts movement of the head unit with respect to the substrate.

5. The cleaning tool according to claim 1, wherein:
the body part comprises:
- reel units that each comprise:
  - a supply reel that supplies the cleaning unit to the head;
  - a take-up reel that takes up the cleaning unit collected from the head; and
  - a rotation shaft that allows the supply reel and the take-up reel to rotate, and
- a drive unit that generates a rotation force for the reel units; and
- the drive unit comprises a reverse-rotation prevention mechanism that restricts rotation to only one of a direction of supplying the cleaning unit to the head or a direction of taking up the cleaning unit collected from the head.

6. The cleaning tool according to claim 5, wherein the body part further comprises:
- a connector that transmits the rotation force to the reel units.

* * * * *